United States Patent
Geier et al.

(10) Patent No.: US 6,699,807 B2
(45) Date of Patent: *Mar. 2, 2004

(54) GLASS CERAMIC MATERIAL, METHOD FOR PRODUCING THE SAME AND SPARK PLUG CONTAINING SUCH A GLASS CERAMIC MATERIAL

(75) Inventors: Heinz Geier, Leonberg (DE); Rudolf Pollner, Bamberg (DE); Imke Koengeter, Stuttgart (DE); Ulrich Eisele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/980,893

(22) PCT Filed: Feb. 20, 2001

(86) PCT No.: PCT/DE01/00648

§ 371 (c)(1),
(2), (4) Date: Mar. 23, 2002

(87) PCT Pub. No.: WO01/74731

PCT Pub. Date: Oct. 11, 2001

(65) Prior Publication Data

US 2002/0115549 A1 Aug. 22, 2002

(30) Foreign Application Priority Data

Apr. 1, 2000 (DE) .......................... 100 16 416

(51) Int. Cl.[7] .......................... C03C 10/04; C03C 8/18; C03C 8/20

(52) U.S. Cl. .................. 501/5; 501/8; 501/15; 501/17; 501/19; 501/20; 501/21; 501/70; 501/73; 65/33.5; 65/33.6

(58) Field of Search .......................... 501/5, 8, 15, 17, 501/19, 20, 21, 70, 73; 313/130, 135; 252/513, 514, 520.21, 520.22; 65/33.5, 33.6

(56) References Cited

U.S. PATENT DOCUMENTS

| | | | | |
|---|---|---|---|---|
| 3,931,055 A | * | 1/1976 | Fiese ........................ | 525/503 |
| 4,187,115 A | * | 2/1980 | Reade ........................ | 65/33 |
| 4,853,349 A | * | 8/1989 | Martin ........................ | 501/8 |
| 5,645,765 A | * | 7/1997 | Asada et al. ............... | 252/518 |
| 6,348,424 B1 | * | 2/2002 | Hazeyama et al. ......... | 501/5 |
| 6,426,586 B1 | * | 7/2002 | Young et al. ............... | 313/130 |

FOREIGN PATENT DOCUMENTS

| | | |
|---|---|---|
| DE | 22 45 403 | 3/1974 |
| DE | 196 51 454 | 6/1998 |
| DE | 197 08 105 | 9/1998 |
| JP | 4-275976 | * 10/1992 |
| WO | 98/38138 | * 9/1998 |

OTHER PUBLICATIONS

Duan, R, *Effect of Changing TiO2 Content on Structure and Crystallization of CaO–A12O3–SiO2 System Glasses*, Journal of the European Ceramic Society, GB, Elsevier Science Publishers, Nov. 1, 1998, vol. 18, No. 12 (pp. 1729–1735).

Villegas, MA, *Propiedades Y Characterization Estructural De Vidrios Del Sistema CAO–TIO2–AL2O3–SIO2*, Boletin De La Sociedad Espanola De Ceramica Y Vidrio, Madrid, 1995, vol. 34, No. 3 (pp. 135–139).

* cited by examiner

*Primary Examiner*—Karl Group
(74) *Attorney, Agent, or Firm*—Kenyon & Kenyon

(57) ABSTRACT

A glass ceramic, for use as a resistor or a gas-tight glass ceramic solder for use in a spark plug, includes a fused seal of a starting glass fused from a starting mixture containing $SiO_2$, $Al_2O_3$, $TiO_2$ and CaO, the fused seal including crystalline phases in at least some areas. A method for producing such a glass ceramic provides for the starting glass to be processed in a first method step to form a starting material, which is heated for a first period of time in a second method step from a starting temperature, which is below the softening temperature of the starting glass, to a fusion temperature, which is above the softening temperature of the starting glass, and is kept at that temperature for a second period of time and finally is cooled again. A spark plug may include a terminal stud and a center electrode, which are electrically connected across a resistor that is formed in at least some areas by the glass ceramic.

28 Claims, 2 Drawing Sheets

US 6,699,807 B2

GLASS CERAMIC MATERIAL, METHOD FOR PRODUCING THE SAME AND SPARK PLUG CONTAINING SUCH A GLASS CERAMIC MATERIAL

FIELD OF THE INVENTION

The present invention relates to a glass ceramic, which may be used, in particular as a resistor or as a gas-tight ceramic solder in a spark plug, a method of producing the glass ceramic and a spark plug having such a glass ceramic.

BACKGROUND INFORMATION

German Published Patent Application No. 196 51 454 refers to a spark plug including a terminal stud connected to a center electrode across a resistor in the form of a fused glass seal arranged between the electrode and the terminal stud. This resistor seal may be made of a glass material or a glass ceramic material, which may be provided with a metal phase in the form of a network to increase the electric conductivity. This metal phase may be achieved by a surface metallization of glass powder deposited in a currentless operation and then fused in the spark plug to form a resistor.

German Published Patent Application No. 196 23 989 refers to a spark plug in which the terminal stud is connected to the center electrode by a burn-off resistor and a contact pin is arranged between the burn-off resistor and the center electrode.

SUMMARY OF THE INVENTION

An exemplary glass ceramic according to the present invention is believed to be suitable for use as a glass ceramic seal in a spark plug, in which the seal may have either a high or low resistance, depending on its composition. This exemplary glass ceramic may be stable at temperatures up to more than 1000° C., so that it may be used as a burn-off resistor in a spark plug.

This exemplary glass ceramic may be suitable for use in spark plugs having a platinum center electrode, which may be heated up to 950° C. in the area of the insulator base during operation. This exemplary glass ceramic may tolerate an operating temperature of 900° C. for more than 2000 hours.

Another exemplary glass ceramic according to the present invention may be fused from a glass powder or a glass powder mixture at a process temperature of less than approximately 950° C., including a temperature between approximately 850° C. and 950° C., without requiring the use of a protective gas. This exemplary glass ceramic may have high voltage strength up to 20 kV/mm at room temperature or up to 10 kV/mm at 800° C., a thermal expansion coefficient of the glass ceramic being adapted to that of aluminum oxide ($Al_2O_3$), which may be an insulator material for use in spark plugs. The thermal expansion coefficient may be approximately 6 ppm/K from 100° C. to 200° C. and approximately 9 ppm/K from 700° C. to 800° C. On the basis of these properties, an exemplary glass ceramic of the present invention is believed to be suitable for producing a glass ceramic seal as a burn-off resistor in a spark plug having an adjacent insulator made of dense, pure crystalline aluminum oxide.

The high temperature stability and high voltage strength may be achieved because an exemplary glass ceramic according to the present invention may have refractory phases at least partially or at least in some areas, for example, the phases anorthite, wollastonite and titanite.

Through controlled processing of a starting glass to a starting material, an exemplary glass ceramic may be produced according to the present invention in the form of an electrically conducting glass ceramic solder. The exemplary glass solder may be used, for example, to contact a glass ceramic resistor seal having a different composition to a metal, such as a contact pin, a stud or a center electrode in a spark plug.

An exemplary glass ceramic according to the present invention may at least better guarantee thermally stable and gas-tight contacting of the center electrode or the stud in a spark plug by varying its composition.

With regard to high voltage strength, thermal stability and adaptation of the thermal expansion coefficient to the surrounding insulator made of, for example, aluminum oxide, an exemplary glass ceramic according to the present invention may have a composition including a starting mixture containing approximately 43 wt % to 48 wt % $SiO_2$, approximately 16.5 wt % to 18 wt % $Al_2O_3$, approximately 6 wt % to 10.5 wt % $TiO_2$, approximately 0.3 wt % to 1.2 wt % $Na_2O$, approximately 0.3 wt % to 1.2 wt % $K_2O$ and approximately 24.5 wt % to 28.5 wt % CaO.

Another exemplary glass ceramic according to the present invention, with regard to the development of refractory phases through a controlled temperature treatment of the starting glass, may be obtained by a glass ceramic having a composition including a starting mixture composed of approximately 45 wt % $SiO_2$, approximately 17 wt % $Al_2O_3$, approximately 9 wt % $TiO_2$, approximately 0.5 wt % $Na_2O$, approximately 0.5 wt % $K_2O$ and approximately 28 wt % CaO.

To adjust electric properties of an exemplary glass ceramic according to the present invention, two different alternatives may be used. First, a metal phase may be developed, which may be embedded in the glass ceramic and which may be a network. Second, a carbon phase may be developed, which may be embedded in the glass ceramic and which may be a network. The carbon phase may be composed of pyrolyzed carbon.

To produce another exemplary glass ceramic according to the present invention having desired crystalline phases, the fusion temperature of the starting material used may be between 850° C. and 950° C. The heated starting material may then be kept at this temperature for a first period of time, which may be from 5 to 15 minutes, whereupon the refractory phases may be formed, and the starting material may be converted into a glass ceramic. A glass ceramic is understood in this connection to be a material which, unlike a glass, has crystalline phases in at least some areas.

To produce yet another exemplary glass ceramic according to the present invention having a low resistance, for example, for use as a glass ceramic solder, the glass powder used in an exemplary method according to the present invention may be provided with a metallization composed of a metal with high temperature stability or, alternatively, a compound including a glass powder, a binder and a carbon black powder.

DETAILED DESCRIPTION

Figure 1:
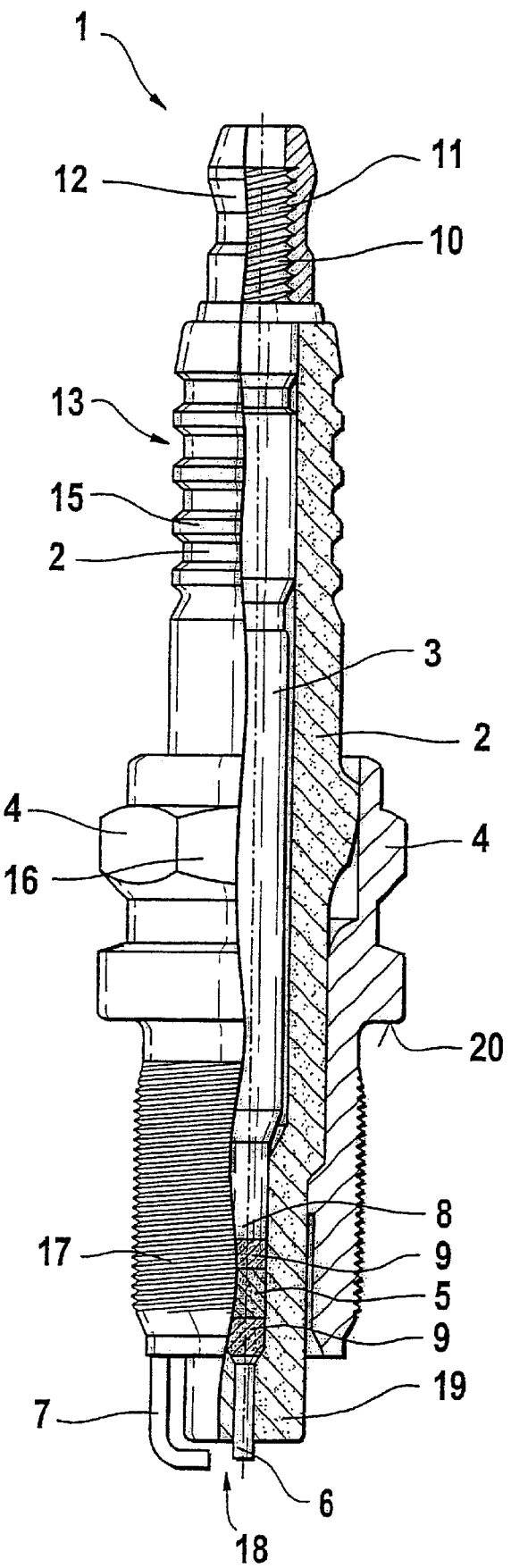
FIG. 1 shows a sectional view of a spark plug having an exemplary glass ceramic seal as a burn-off resistor.

To create a glass ceramic seal as a burn-off resistor or as a ceramic solder for use in a spark plug 1, a starting glass is fused from a starting mixture, which may be composed of approximately 38 to 48 wt % $SiO_2$, approximately 15 to 19 wt % $Al_2O_3$, approximately 4.5 to 11 wt % $TiO_2$, approximately 0 to 1.5 wt % $Na_2O$, approximately 0 to 1.5 wt % $K_2O$ and approximately 23 to 30 wt % CaO. In addition, $Li_2O$ may be added to the starting mixture in an amount of up to approximately 1.5 wt %.

The starting mixture may be composed of approximately 43 to 48 wt % $SiO_2$, approximately 16.5 to 18 wt % $Al_2O_3$, approximately 6 to 10.5 wt % $TiO_2$, approximately 0.3 to 1.2 wt % $Na_2O$, approximately 0.3 to 1.2 wt % $K_2O$ and approximately 24.5 to 28.5 wt % CaO. It is believed that best results may be obtained with a the starting mixture composed of 45 wt % $SiO_2$, 17 wt % $Al_2O_3$, 9 wt % $TiO_2$, 0.5 wt % $Na_2O$, 0.5 wt % $K_2O$ and 28 wt % CaO.

To produce a burn-off resistor in the form of a glass ceramic resistor seal, which may be connected by a glass ceramic solder to adjacent metallic parts of the spark plug, the starting mixture described above may first be fused to form a starting glass, which may then be split into two batches. The first batch of this starting glass may be ground to form a glass powder having a mean particle size of approximately 150 μm to 250 μm.

An exemplary glass powder prepared in this way may be used as an actual fused high-resistance resistor seal in the form of a burn-off resistor for use in a spark plug.

The second batch of the starting glass may be used to produce a glass ceramic solder for joining the burn-off resistor to adjacent metal parts in the spark plug.

To produce this glass ceramic solder in the form of a low-resistance glass ceramic, two alternatives may be used.

A first exemplary embodiment provides for a starting glass to be ground to form a glass powder having a mean particle size of less than approximately 250 μm. The starting glass may then be provided with a surface metallization by a currentless metallization method, such as that referred to in German Published Patent Application No. 196 51 454. The surface metallization may include a metal having a high-temperature stability, such as platinum, palladium, nickel, tungsten or an alloy of these metals. Palladium may be beneficial. The thickness of the surface metallization may be from approximately 0.5 nm to 10 nm, and in particular from 2 nm to 5 nm.

A second exemplary embodiment provides for the starting glass to be processed to form a starting material in a first method step. A first portion of the starting glass may be ground to form a first glass powder having a mean particle size of approximately 150 μm to 250 μm, and a second portion of the starting glass is ground to form a-second glass powder having a mean particle size of less than approximately 100 μm, in particular, from 5 μm to 70 μm. These two glass powders, having different particle sizes, may then be mixed with a carbon black powder and an organic binder. The carbon black powder may have a mean particle size of approximately 200 nm to 2 μm, in particular, from 400 nm to 600 nm. The organic binder may be a mixture of carboxymethylcellulose and dextrin, using water as a solvent. Zirconium dioxide powder and mullite powder may be added to the starting material, each possibly having a mean particle size of less than approximately 100 μm.

The starting glass may be processed in a first method step to form a starting material containing an amount of approximately 40 wt % to 58 wt % of the first glass powder, an amount of approximately 3 wt % to 13 wt % of the second glass powder, an amount of approximately 0.9 wt % to 2.5 wt % of the carbon black powder, an amount of approximately 10 wt % to 37 wt % of the zirconium dioxide powder, an amount of approximately 8 wt % to 13 wt % of the mullite powder and an amount of approximately 0.6 wt % to 4 wt % of the organic binder. The values given in wt % above are based on a solvent-free starting material, to which a solvent is subsequently added, for example, water. The amount of the solvent may be approximately 12 to 40 vol %,for example, approximately 22 to 37 vol %.

After the starting glass has been prepared in the form of a glass powder and either a surface-metallized glass powder or a processed starting material of a glass powder mixture has been prepared, these materials may then be used in the production of spark plug 1.

FIG. 1 shows a sectioned view of a spark plug 1, conventional spark plugs being referred to in German Published Patent Application No. 196 51 454, and has an insulator 2 made, for example, of pure, crystalline and gas-tight aluminum oxide, a metallic terminal stud 3, a housing 4, a resistor 5 in the form of a glass ceramic resistor seal, a center electrode 6 which may, for example, be made of platinum or coated with platinum, and a ground electrode 7. Terminal stud 3 includes a lower end 8.

Between lower end 8 of terminal stud 3 and resistor 5, a gas-tight glass ceramic solder 9 is provided, which connects resistor 5 and terminal stud 3, so they are gas-tight. A gas-tight glass ceramic solder 9 is provided between center electrode 6 and resistor 5, which connects resistor 5 to center electrode 6, so they are gas-tight.

Spark plug 1 has an upper end 10, a thread 11 and a terminal nut 12 for connecting an ignition line. In addition, a leakage current barrier 13 and a polygonal arrangement 16 are provided, with the help of which spark plug 1 may be screwed into an engine block. A thread 17 is provided for this purpose. Center electrode 6 and ground electrode 7 are separated by a spacer 18. Insulator 2 protrudes to a great extent, shielding center electrode 6 from ground electrode 7 in some areas. For this purpose, insulator 2 has an insulator base tip 19, so that a spark gap can be established only between the tip of center electrode 6 and ground electrode 7. Spark plug 1 has an end face 20 which limits the extent to which spark plug 1 can be screwed into an engine block.

To produce the spark plug of FIG. 1, insulator 2 may be first provided with center electrode 6 in an available manner. Then, either the glass powder that has been provided with a surface metallization or the prepared starting material composed of the glass powder mixture, carbon black, organic binder and optionally other ingredients may be packed into the cavity in insulator 2 as glass ceramic solder 9. To produce high-resistance resistor 5, the starting glass, which has been ground to form a glass powder, may be packed into insulator 3. Either the surface-metallized glass powder or the starting material that has been prepared in the manner described above, may be added on top of the ground starting glass. Terminal stud 3 may be placed on top of this sequence of layers.

The second method step for producing an exemplary glass ceramic provides for the different materials introduced into the insulator to be heated for a first period of time from a starting temperature, which may be below the softening temperature $T_g$ of the starting glass, to a fusion temperature, which may be above the softening temperature $T_g$ of the starting glass, to form resistor 5 or gas-tight glass ceramic solder 9 together with the spark plug and inserted stud 3. Spark plug 1 may then be kept at this temperature for a second period of time and then cooled again.

The starting temperature in the heat treatment described above may be between 10° C. and 40° C., and which may be room temperature. The fusion temperature may be approximately 850° C. to 950° C. The first period of time during which the spark plug is heated together with the added starting materials may be between 5 and 15 minutes, for example, between 8 and 10 minutes. The second period of time during which the spark plug is kept at the fusion temperature may be between 5 and 25 minutes, for example, between 9 and 15 minutes. In the course of this heat treatment, i.e., during the fusion operation, crystallization may occur at least partially and/or at least in some areas in the starting glass. This may result in the formation of, among other things, refractory phases anorthite ($CaO \cdot Al_2O_3 \cdot 2SiO_2$), wollastonite ($CaO \cdot 2SiO_2$) and titanite ($CaO \cdot TiO_2 \cdot SiO_2$).

After this heat treatment, a seal may be formed between center electrode 6 and stud 3 in the form of a glass ceramic which may have a resistance of more than 1 kΩ in the area of resistor 5, the glass ceramic forming a high-resistance seal as a burn-off resistor. Two areas may be formed with a gas-tight glass ceramic solder 9 connecting resistor 5 to center electrode 6 and stud 3. Depending on the composition selected, gas-tight glass ceramic solder 9 may be a glass ceramic including a metal phase embedded in it, for example, a metal phase in the form of a network, in at least some areas, so that this metal phase essentially carries the electric conductivity of the glass ceramic solder. The glass ceramic solder 9 may be in the form of a glass ceramic having a carbon phase embedded in it in at least some areas, for example, a carbon phase in the form of a network. This carbon phase may be formed by pyrolysis from the organic binder and/or carbon black powder added to the prepared starting material.

Glass transition temperature $T_g$ of the starting glass may be 753° C., but it may also be between 670° C. and 780° C., depending on the composition of the starting glass. The dilatometric softening temperature $E_g$ of the starting glass thus produced may be 786° C., but it may also vary between approximately 720° C. and 820° C., depending on the composition of the starting glass. The thermal expansion coefficient α of the starting glass may be approximately $8.3 \times 10^{-6}$/K at a temperature of 100° C. to 500° C., but it may also vary between $6.7 \times 10^6$/K and $8.8 \times 10^6$/K, within the scope of the limits as referred to above.

Figure 2:
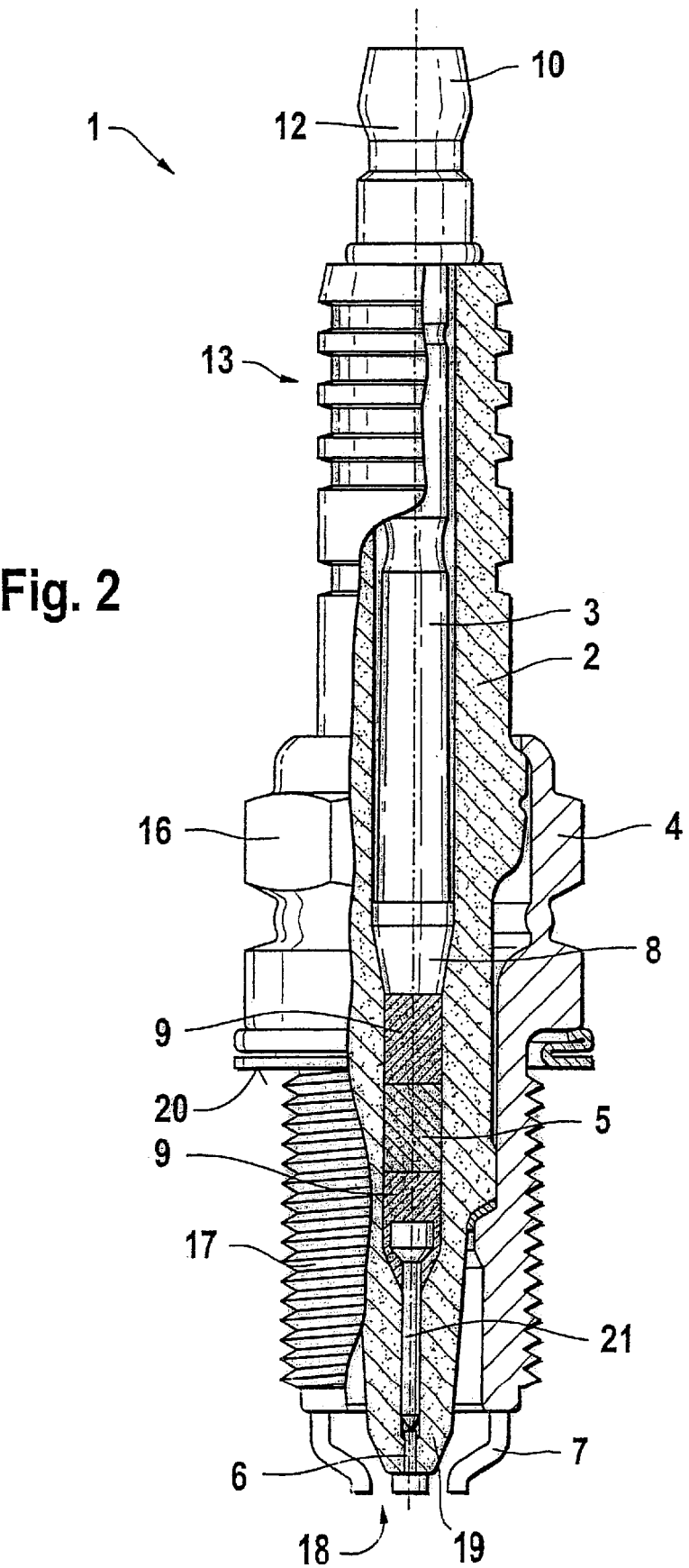
FIG. 2 shows a sectional view of a spark plug having another exemplary glass ceramic seal as a burn-off resistor.

FIG. 2 shows an alternative embodiment of spark plug 1. The spark plug of FIG. 2 differs (see German Published Patent Application No. 196 23 989) from the spark plug of FIG. 1, including based on the shapes of ground electrode 7 and center electrode 6. In addition, resistor 5 is set back in comparison with that of FIG. 1, with a terminal stud 21 being provided between resistor 5 and center electrode 6. Production of the spark plug of FIG. 2 is analogous to that in FIG. 1, with regard to the design of resistor 5 and gas-tight glass ceramic solder 9. According to FIG. 2, resistor 5 is not connected on its lower side to center electrode 6, however, and instead is connected in a gas-tight manner to terminal stud 21 by glass ceramic solder 9.

What is claimed is:

1. A glass ceramic, comprising:
    a starting glass fused from a starting mixture containing $SiO_2$, $Al_2O_3$, $TiO_2$, and CaO, wherein the glass ceramic is a fused seal of the starting glass and has crystalline phases in at least some areas;
    wherein the starting mixture contains approximately 38 wt % to 48 wt % of the $SiO_2$, approximately 15 wt % to 19 wt % of the $Al_2O_3$, approximately 4.5 wt % to 10 wt % of the $TiO_2$, approximately 0 wt % to 1.5 wt % of $Na_2O$, approximately 0 wt % to 1.5 wt % of $K_2O$ and approximately 23 wt % to 30 wt % of the CaO.

2. The glass ceramic of claim 1, wherein the starting mixture includes lithium oxide in an amount of up to approximately 1.5 wt %.

3. A glass ceramic, comprising:
    a starting glass fused from a starting mixture containing $SiO_2$, $Al_2O_3$, $TiO_2$, and CaO, wherein the glass ceramic is a fused seal of the starting glass and has crystalline phases in at least some areas;
    wherein the starting mixture contains approximately 43 wt % to 48 wt % of the $SiO_2$, approximately 16.5 wt % to 18 wt % of the $Al_2O_3$, approximately 6 wt % to 10.5 wt % of the $TiO_2$, approximately 0.3 wt % to 1.2 wt % of $Na_2O$, approximately 0.3 wt % to 1.2 wt % of $K_2O$ and approximately 24.5 wt % to 28.5 wt % of the CaO.

4. A glass ceramic, comprising:
    a starting glass fused from a starting mixture containing $SiO_2$, $Al_2O_3$, $TiO_2$, and CaO, wherein the glass ceramic is a fused seal of the starting glass and has crystalline phases in at least some areas;
    wherein the starting mixture contains approximately 45 wt % of the $SiO_2$, approximately 17 wt % of the $Al_2O_3$, approximately 9 wt % of the $TiO_2$, approximately 0.5 wt % of $Na_2O$, approximately 0.5 wt % of $K_2O$ and 28 wt % of the CaO.

5. A glass ceramic, comprising:
    a starting glass fused from a starting mixture containing $SiO_2$, $Al_2O_3$, $TiO_2$, and CaO, wherein the glass ceramic is a fused seal of the starting glass and has crystalline phases in at least some areas;
    wherein the glass ceramic includes refractory phases anorthite, wollastonite and titanite.

6. The glass ceramic of claim 5, wherein the glass ceramic includes in at least some areas a metal phase embedded in the glass ceramic in a network form.

7. A glass ceramic, comprising:
    a starting glass fused from a starting mixture containing $SiO_2$, $Al_2O_3$, $TiO_2$, and CaO, wherein the glass ceramic is a fused seal of the starting glass and has crystalline phases in at least some areas;
    wherein the glass ceramic includes in at least some areas a carbon phase embedded in the glass ceramic in a network form.

8. The glass ceramic of claim 1, wherein starting glass includes a glass powder having a mean particle size of less than 250 μm.

9. A method of producing a glass ceramic, comprising:
    processing a starting glass fused from a starting mixture containing $SiO_2$, $Al_2O_3$, $TiO_2$, and CaO to form a starting material;
    heating the starting material for a first time period from a starting temperature that is below a softening temperature of the starting glass to a fusion temperature that is above the softening temperature of the starting glass;
    maintaining the starting material at the fusion temperature for a second time period; and
    cooling the starting material;
    wherein the glass ceramic is a fused seal of the starting glass and has crystalline phases in at least some areas,
    wherein the step of processing the starting glass includes milling the starting glass to form a glass powder having a mean particle size of less than 250 μm, and
    wherein the glass powder is provided at least partially with a surface metallization in the step of processing.

10. The method of claim 9, wherein the starting temperature is between approximately 10° C. and 40° C. and the fusion temperature is between approximately 850° C. and 950° C.

11. The method of claim 9, wherein the first time period is between approximately 5 and 15 minutes, and the second time period is between approximately 5 and 25 minutes.

12. A method of producing a glass ceramic, comprising:
processing a starting glass fused from a starting mixture containing $SiO_2$, $Al_2O_3$, $TiO_2$, and CaO to form a starting material;
heating the starting material for a first time period from a starting temperature that is below a softening temperature of the starting glass to a fusion temperature that is above the softening temperature of the starting glass;
maintaining the starting material at the fusion temperature for a second time period; and
cooling the starting material;
wherein the glass ceramic is a fused seal of the starting glass and has crystalline phases in at least some area,
wherein the step of processing the starting glass includes milling the starting glass to form a glass powder having a mean particle size of less than 250 μm, and
wherein the glass powder is provided with a metallization selected from a group consisting of: a metal that is stable at high temperatures, platinum, palladium, nickel, tungsten, and an alloy having a thickness of 0.5 nm to 10 nm.

13. A method of producing a glass ceramic, comprising:
processing a starting glass fused from a starting mixture containing $SiO_2$, $Al_2O_3$, $TiO_2$, and CaO to form a starting material;
heating the starting material for a first time period from a starting temperature that is below a softening temperature of the starting glass to a fusion temperature that is above the softening temperature of the starting glass;
maintaining the starting material at the fusion temperature for a second time period; and
cooling the starting material;
wherein the glass ceramic is a fused seal of the starting glass and has crystalline phases in at least some area; and
wherein the step of processing the starting glass to form the starting material includes milling a first portion of the starting glass to form a first glass powder having a mean particle size of approximately 150 μm to 250 μm, milling a second portion of the starting glass to form a second glass powder having a mean particle size of less than approximately 100 μm, and mixing the first glass powder and the second glass powder together with a carbon black powder and an organic binder.

14. The method of claim 13, wherein the carbon black powder has a mean particle size of approximately 200 nm to 2 μm.

15. The method of claim 13, wherein the organic binder includes a mixture of carboxymethylcellulose and dextrin, with water as a solvent.

16. The method of claim 13, wherein the step of processing the starting glass to form the starting material includes adding zirconium dioxide having a mean particle size of less than 100 μm.

17. The method of claim 13, wherein the step of processing the starting glass to form the starting material includes adding mullite.

18. The method of claim 13, wherein the starting material contains an amount of approximately 40 wt % to 58 wt % of the first glass powder, an amount of approximately 3 wt % to 13 wt % of the second glass powder, an amount of approximately 0.9 wt % to 2.5 wt % of the carbon black powder, an amount of approximately 10 wt % to 37 wt % of zirconium dioxide, an amount of approximately 8 wt % to 13 wt % of mullite and an amount of approximately 0.6 wt % to 4 wt % of the organic binder, the amounts in wt % being based on a solvent-free starting material.

19. The method of claim 13, wherein a solvent is added to the starting material in an amount of approximately 12 to 40 vol %.

20. A spark plug, comprising:
a resistor made in at least some areas of a glass ceramic, wherein the glass ceramic includes a starting glass fused from a starting mixture containing $SiO_2$, $Al_2O_3$, $TiO_2$, and CaO, and the glass ceramic forms a fused seal of the starting glass and has crystalline phases in at least some areas of the glass ceramic; and
a terminal stud and a center electrode electrically connected across the resistor.

21. The spark plug of claim 20, further comprising a contact pin arranged between the resistor and the center electrode.

22. The spark plug of claim 20, wherein the resistor is connected to at least one of the terminal stud and the center electrode by a glass ceramic solder made of a glass ceramic including a starting glass fused from a starting mixture containing $SiO_2$, $Al_2O_3$, $TiO_2$, and CaO, the glass ceramic forming a fused seal of the starting glass and having crystalline phases in at least some areas.

23. The spark plug of claim 21, wherein the resistor is connected to at least one of the terminal stud and the contact pin by a glass ceramic solder made of a glass ceramic including a starting glass fused from a starting mixture containing $SiO_2$, $Al_2O_3$, $TiO_2$, and CaO, the glass ceramic forming a fused seal of the starting glass and having crystalline phases in at least some areas.

24. The glass ceramic of claim 1, wherein the starting mixture includes lithium oxide in an amount of up to approximately 1.5 wt %.

25. The method of claim 9, wherein the first time period is between approximately 8 and 10 minutes, and the second time period is between approximately 9 and 15 minutes.

26. The method of claim 13, wherein the second glass powder has a mean particle size of approximately 5 μm to 70 μm.

27. The method of claim 13, wherein the mean particle size of the carbon black powder is approximately 400 nm to 600 nm.

28. The method of claim 13, wherein a solvent is added to the starting material in an amount of approximately 22 vol % to 37 vol %.

* * * * *